United States Patent
Baumann et al.

(10) Patent No.: US 6,923,087 B2
(45) Date of Patent: Aug. 2, 2005

(54) RECEIVING DEVICE FOR PEDALS OF A MOTOR VEHICLE

(75) Inventors: Hans-Uwe Baumann, Stuttgart (DE); Dieter Semmel, Stuttgart (DE); Vasil Barbunopulos, Vaihingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 521 days.

(21) Appl. No.: 09/891,271

(22) Filed: Jun. 27, 2001

(65) Prior Publication Data

US 2001/0054325 A1 Dec. 27, 2001

(30) Foreign Application Priority Data

Jun. 27, 2000 (DE) .......................... 100 31 157

(51) Int. Cl.[7] ................................ G05G 1/14
(52) U.S. Cl. .......................... 74/512; 74/560
(58) Field of Search .................. 74/512, 522, 562, 74/561, 562.5, 560, 513, 514; 403/52, 59, 60, 119

(56) References Cited

U.S. PATENT DOCUMENTS

| | | | | |
|---|---|---|---|---|
| 3,192,794 A | * | 7/1965 | Bruhn .......................... | 74/512 |
| 3,754,480 A | * | 8/1973 | Bodnar et al. ................ | 74/512 |
| 3,765,264 A | * | 10/1973 | Bruhn, Jr. ..................... | 74/512 |
| 4,299,137 A | * | 11/1981 | Malecha ....................... | 74/512 |
| 5,398,569 A | | 3/1995 | Carr ............................ | 74/560 |
| 5,829,317 A | * | 11/1998 | Vreeken et al. ............... | 74/512 |
| 5,865,067 A | * | 2/1999 | Knapp .......................... | 74/512 |
| 6,374,695 B1 | * | 4/2002 | Johansson et al. ............ | 74/512 |

FOREIGN PATENT DOCUMENTS

| | | |
|---|---|---|
| DE | 298 07 214 | 4/1998 |
| DE | 19817710 | 10/1999 |
| EP | 0430600 | 6/1991 |

* cited by examiner

*Primary Examiner*—David A. Bucci
*Assistant Examiner*—Bradley J. Van Pelt
(74) *Attorney, Agent, or Firm*—Crowell & Moring LLP

(57) ABSTRACT

A receiving device for pedals of a motor vehicle is provided. The mounting plate has bearings for a brake pedal, a clutch pedal and an accelerator pedal. The clutch pedal can be demounted or installed in a simple manner as a function of the use of a manual or an automatic transmission.

11 Claims, 3 Drawing Sheets

RECEIVING DEVICE FOR PEDALS OF A MOTOR VEHICLE

BACKGROUND AND SUMMARY OF THE INVENTION

This application claims the priority of German Application No. 100 31 157.1, filed Jun. 27, 2000, the disclosure of which is expressly incorporated by reference herein.

The invention relates to a receiving device for pedals of a motor vehicle comprising a mounting plate on which an accelerator pedal, a brake pedal and a clutch pedal are swivellably disposed.

In a known manner, the foot controls of a motor vehicle comprise a subassembly including an accelerator pedal, a brake pedal and a clutch pedal which, either individually or together, can be installed on a mounting plate into a motor vehicle. In the case of a vehicle with an automatic transmission, there is no clutch pedal, while the clutch pedal is required in the case of a manual transmission.

An object of the invention is to provide a receiving device for pedals of a motor vehicle which receives the pedal as a constructional unit and, in the case of an automatic transmission, a simple installation or removal of the clutch pedal is ensured.

According to certain preferred embodiments of the invention, this object is achieved by way of the clutch pedal being swivellably held in an insert which forms a preassembled constructional unit with the clutch pedal, which constructional unit can be fastened between projecting legs of the mounting plate and is constructed to be optionally removable. Additional advantageous characteristics are contained in the subclaims.

Preferred advantages achieved by way of certain preferred embodiments of the invention are that a clutch pedal can be removed from a receiving device and installed into it in a simple manner without the requirement of a high-expenditure mounting. According to certain preferred embodiments of the invention, this is advantageously achieved in that the clutch pedal is swivellably held in an insert which forms a constructional unit with the pedal. This constructional unit is fastened between two projecting legs of the mounting plate so that an optional installation or absence of the clutch pedal is permitted.

So that the absence or the installation of the clutch pedal can be implemented without any high mounting expenditures, the insert for the clutch pedal can be fastened, on the one hand, by way of an existing continuous bearing bolt for the brake pedal and, on the other hand, by way of a separate fastening screw between the legs of the mounting plate.

An optimal bracing of the pedal insert on the mounting plate between the legs takes place in that the bearing bolt for the swivellable receiving of the brake pedal is connected with a fitted-over sleeve of the bolt, which sleeve forms a support between the inner receiving leg for the insert and another outer supporting leg for a head of the bearing bolt on the mounting plate.

A good stability of the fastening according to certain preferred embodiments of the invention is achieved particularly in that the insert has a U-profile-shaped cross-section, and the bearing bolt as well as the fastening screw are arranged at a vertical distance from one another.

A preferred embodiment of the invention is illustrated in the drawings and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
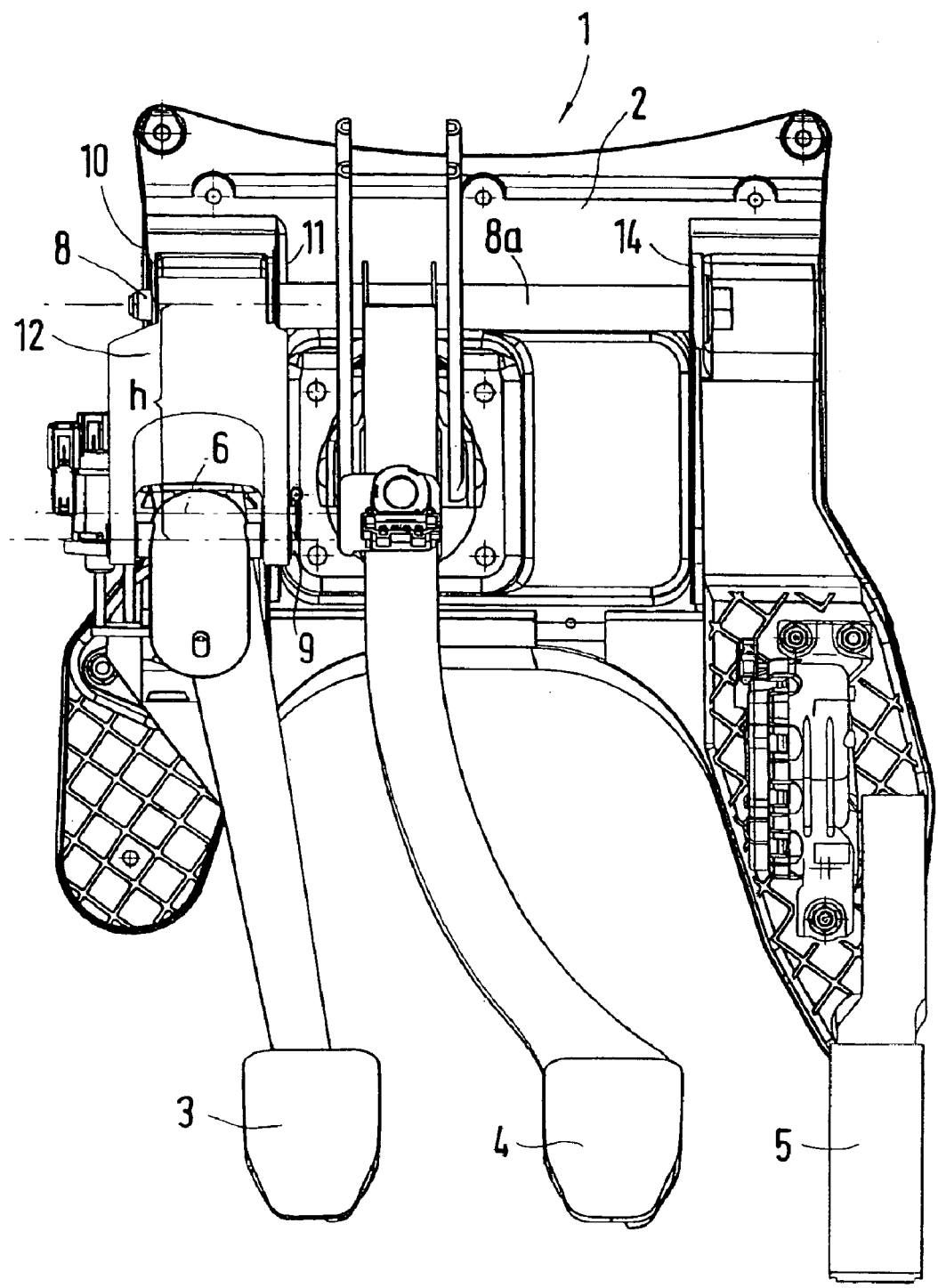
FIG. 1 shows a top view of a receiving device of the pedals with the clutch pedal, the brake pedal and the accelerator pedal.

As in FIG. 1, the receiving device 1 comprises basically a mounting plate 2 with a clutch pedal 3, a brake pedal 4 and an accelerator pedal 5. As a unit with the pedals 3, 4 and 5, the mounting plate 2 can be fastened, for example, on a front wall of a vehicle.

The clutch pedal 3 is provided with an insert 12 in which the pedal 3 is swivellably held on an axis 6. Together with the pedal 3, the insert 12 forms a preassembled finished constructional unit 7 which is connected with the mounting plate 2 by way of screws 8, 9.

For this purpose, the mounting plate 2 has two legs 10, 11 which project from the mounting plate and between which the insert 12 can be inserted in the case of a manual transmission and can be absent in the case of an automatic transmission.

The fastening of the insert 12 takes place by way of the screws 8, 9 which are arranged in a mutually spaced manner in the height h. The screw 8 situated on top is present and is simultaneously used as a bearing shaft for the brake pedal 4. In this case, it is provided with a sleeve 8a which is swivellably disposed on the screw 8 and is fixedly connected with the brake pedal 4.

The sleeve 8a extends between the inner leg 11 of the receiving device for the insert 12 and an outer leg 14 on the mounting plate 2. This results in a secure supporting of the insert 12 by the intermediately disposed sleeve 8a on the legs 11 and 14.

Figure 2:
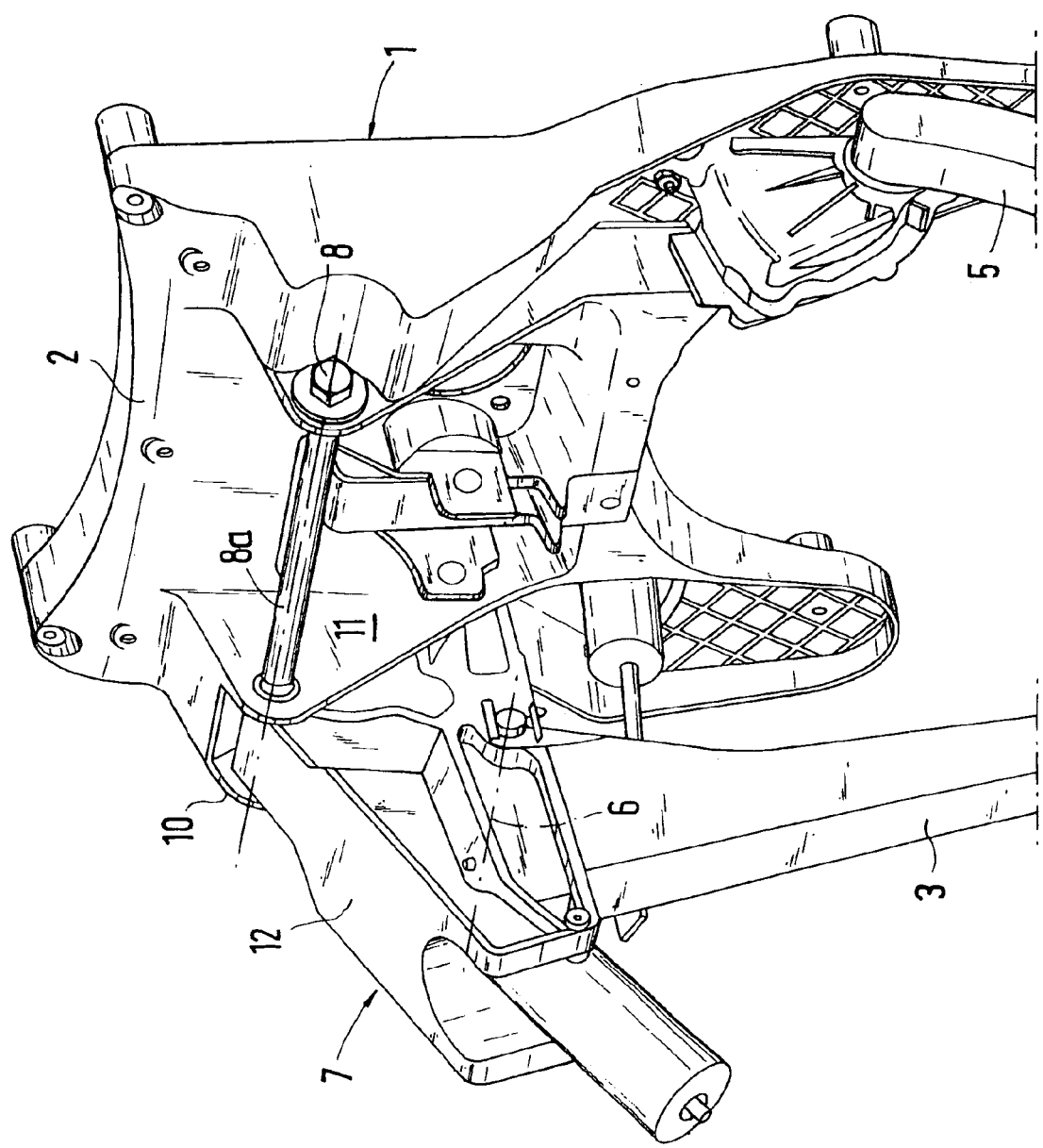
FIG. 2 shows a diagrammatic representation of the receiving device with a clutch pedal inserted by way of an insert.
Figure 3:
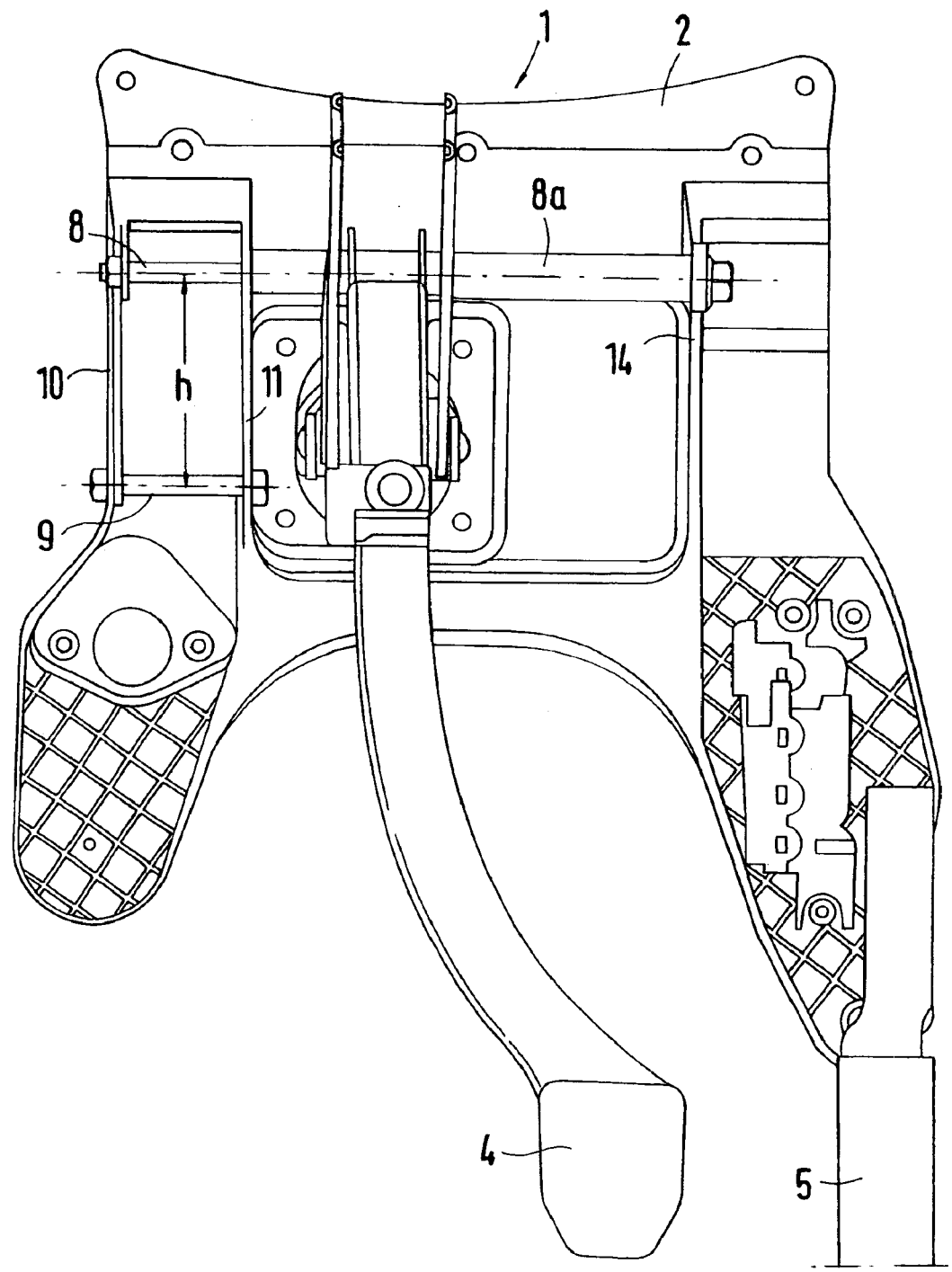
FIG. 3 shows a frontal view of the receiving device according to FIG. 1 with a removed clutch pedal.

As illustrated in detail in FIG. 2, the insert has a U-shaped profile in its cross-section, the outer legs of the profile being situated opposite the legs 10, 11 of the mounting plate 2. When the clutch pedal 3 is absent, as illustrated in detail in FIG. 3, the screw 8 is used in an unchanged manner, but screw 9 can, for example, be absent.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Receiving device for pedals of a motor vehicle comprising a mounting plate on which an accelerator pedal, a brake pedal and a clutch pedal are swivellably disposed, wherein the clutch pedal is swivellably held in an insert which forms a preassembled constructional unit with the clutch pedal, which said constructional unit can be fastened between projecting legs of the mounting plate and is constructed to be optionally removable.

2. Receiving device according to claim 1, wherein the insert can be fastened, by way of an existing continuous bearing bolt for the brake pedal and by way of a fastening screw between the projecting legs of the mounting plate.

3. Receiving device according to claim 2, wherein the insert has a U-profile-shaped cross-section and the bearing bolt as well as the fastening screw are arranged at a vertical distance with respect to one another.

4. Receiving device according to claim 2, wherein the bearing bolt for the swivellable receiving of the brake pedal is fixedly connected with a fitted-over sleeve of the bolt, said sleeve forming a support between an inner receiving leg of the projecting legs for the insert and another outer supporting leg on the mounting plate for a head of the bearing bolt.

5. Receiving device according to claim 3, wherein the bearing bolt for the swivellable receiving of the brake pedal is fixedly connected with a fitted-over sleeve of the bolt, said sleeve forming a support between an inner receiving leg of the projecting legs for the insert and another outer supporting leg on the mounting plate for a head of the bearing bolt.

6. A pedal assembly for a motor vehicle, comprising:
a mounting plate,
an accelerator pedal swivellably disposed on the mounting plate,
a brake pedal swivellably disposed on the mounting plate, and
a pre-assembled constructional unit fastenable between two projecting legs of the mounting plate and having a clutch pedal swivellably held in an insert,
wherein the pre-assembled constructional unit is constructed to be optionally removable.

7. A pedal assembly according to claim 6, wherein the insert can be fastened, by way of an existing continuous bearing bolt for the brake pedal and by way of a fastening screw between the projecting legs of the mounting plate.

8. A pedal assembly according to claim 7, wherein the insert has a U-profile-shaped cross-section and the bearing bolt as well as the fastening screw are arranged at a vertical distance with respect to one another.

9. A method of making a receiving device for pedals of a motor vehicle, comprising:
swivellably arranging an accelerator pedal and a brake pedal on a mounting plate of the receiving device,
providing a pre-assembled constructional unit, which is formed by swivellably arranging a clutch pedal in an insert, and is constructed to be optionally removable, and
fastening the preassembled constructional unit between projecting legs of the mounting plate.

10. A method according to claim 9, wherein the insert can be fastened, by way of an existing continuous bearing bolt for the brake pedal and by way of a fastening screw between the projecting legs of the mounting plate.

11. A method according to claim 10, wherein the insert has a U-profile-shaped cross-section and the bearing bolt as well as the fastening screw are arranged at a vertical distance with respect to one another.

* * * * *